UNITED STATES PATENT OFFICE.

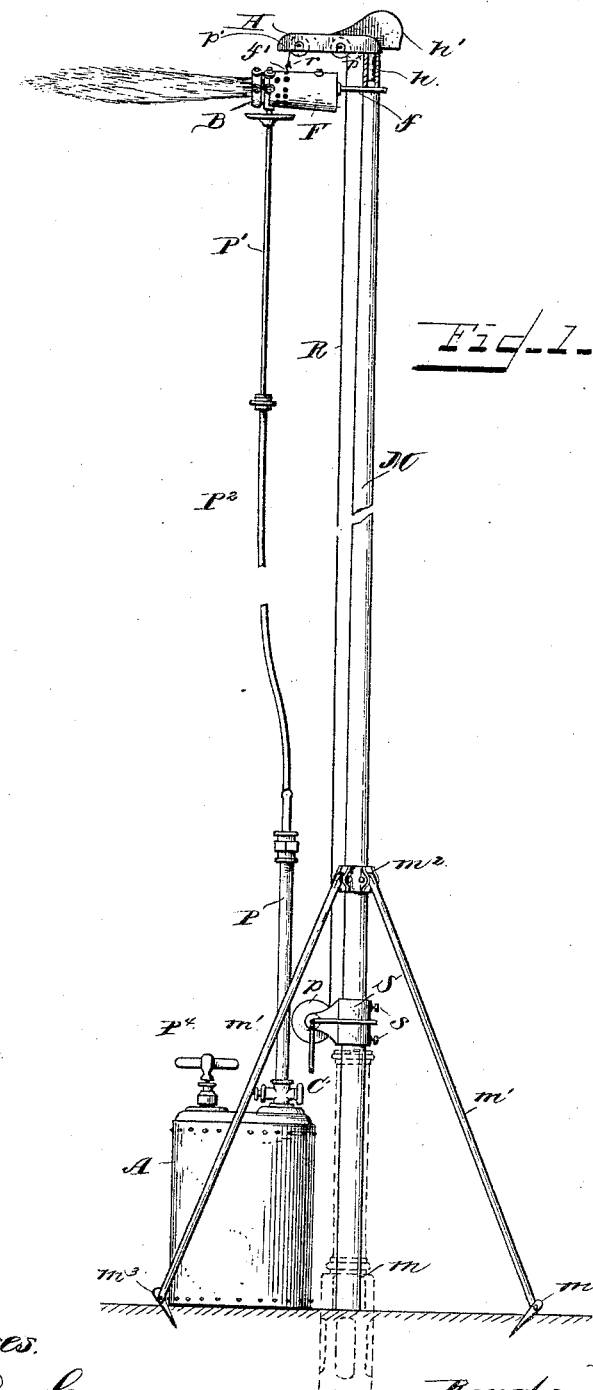

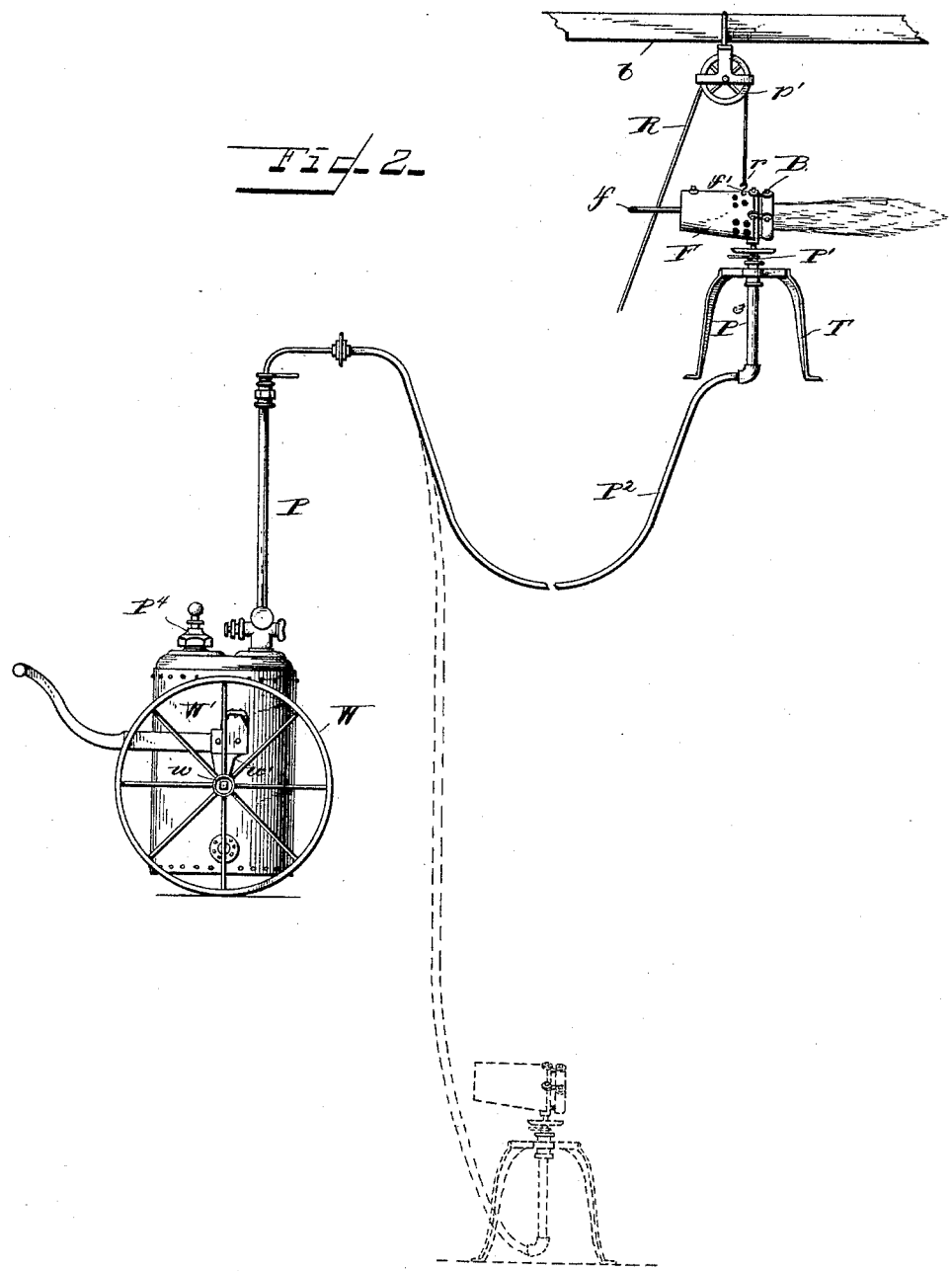

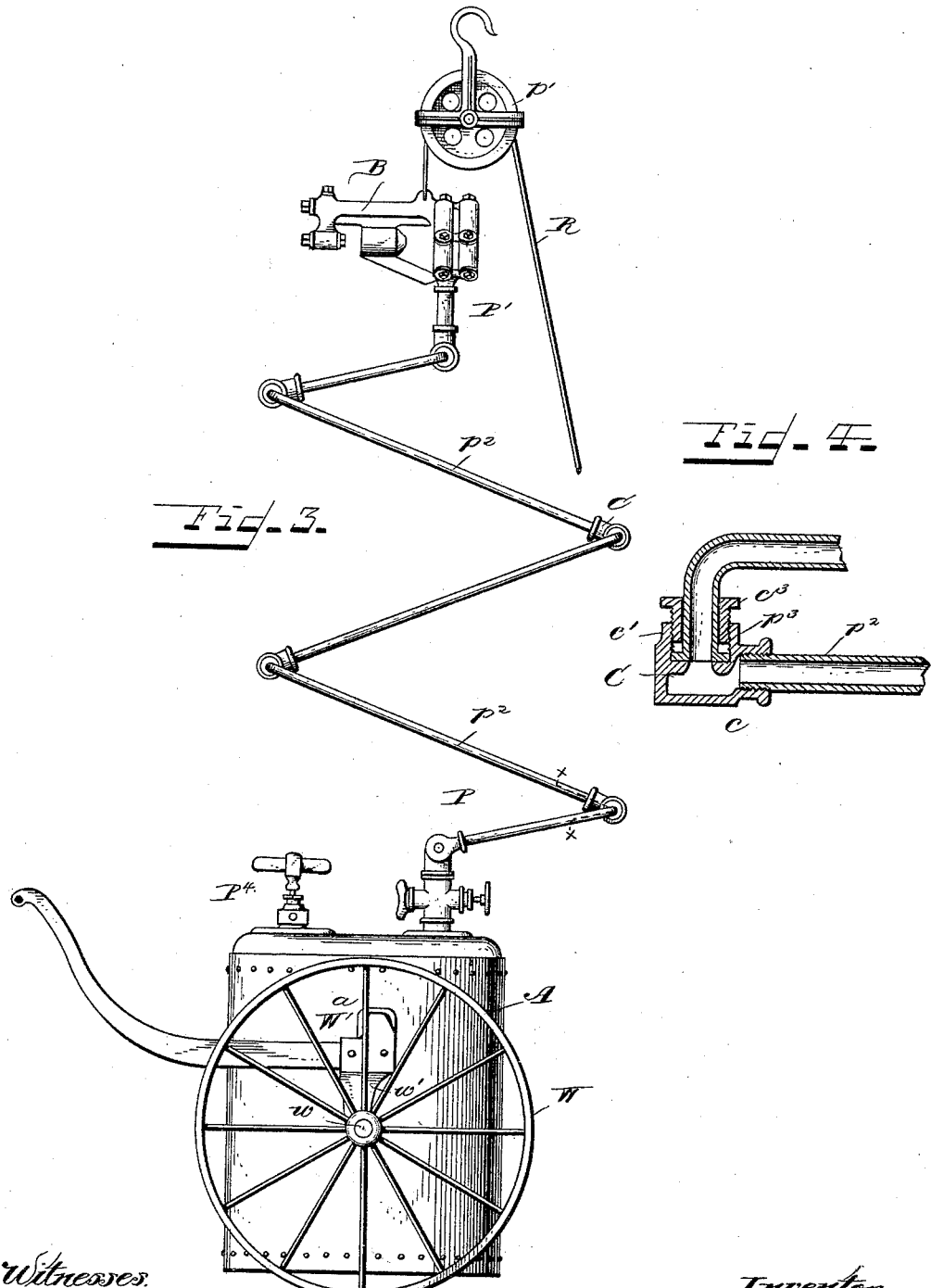

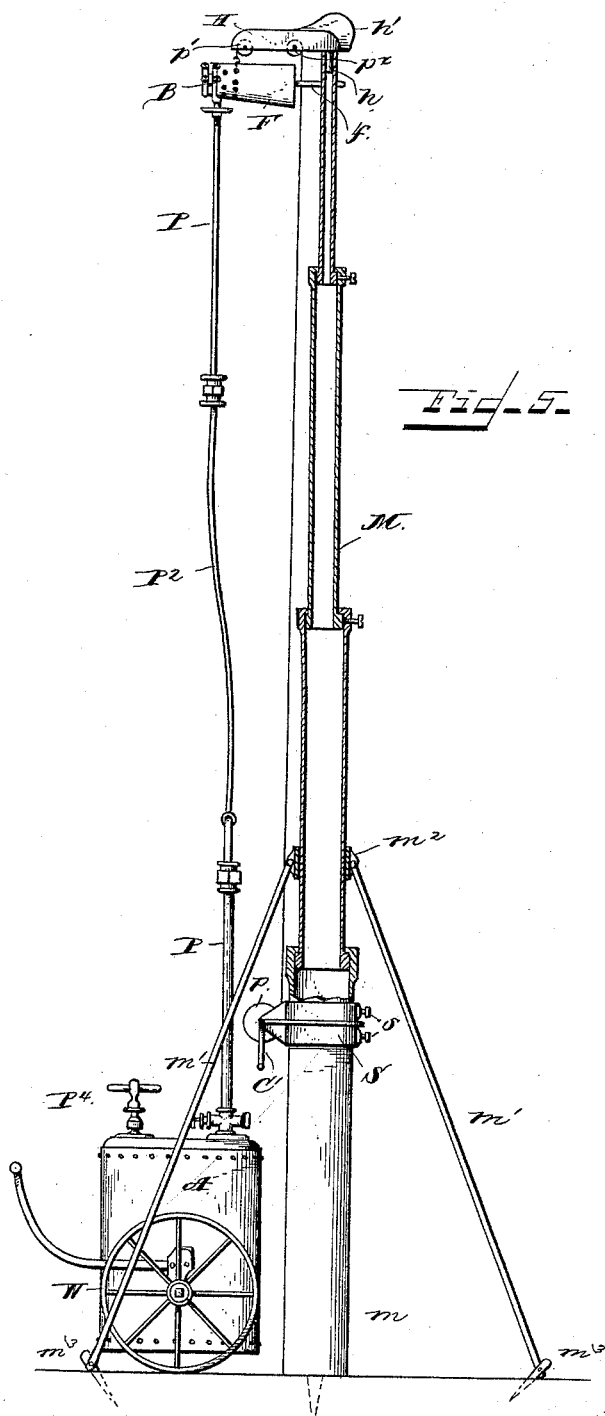

ROUGHSEDGE WALLWORK AND ARTHUR COLLINGS WELLS, OF MANCHESTER, ENGLAND.

ILLUMINATING APPARATUS.

SPECIFICATION forming part of Letters Patent No. 440,520, dated November 11, 1890.

Application filed July 5, 1889. Serial No. 316,620. (No model.) Patented in England July 10, 1888, No. 9,976, and September 29, 1888, No. 14,049.

*To all whom it may concern:*

Be it known that we, ROUGHSEDGE WALLWORK and ARTHUR COLLINGS WELLS, subjects of Her Majesty the Queen of Great Britain, residing at Manchester, in the county of Lancaster, England, (but temporarily residing in the city, county, and State of New York,) have invented certain new and useful Improvements in Illuminating Apparatus, (for which we have obtained Letters Patent in England, dated July 10, 1888, No. 9,976, and September 29, 1888, No. 14,049;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is an elevation, partly in section, of our improved illuminating apparatus. Fig. 2 is a like view showing a stand so combined with the burner as to adapt such burner for use as an elevated or low light. Fig. 3 shows, also in elevation, a modified means for extending the supply-pipe to adapt the burner for use either as a low or elevated light; and Fig. 4 is a section on line $x\,x$ of Fig. 3. Fig. 5 shows in elevation, partly in section, a telescopic mast.

This invention relates to a system of illumination more especially designed for open-air purposes; and it has for its object to provide means whereby a burner or a plurality of burners may be readily elevated above the source of supply or shifted to any desired point within the length of the supply-pipe, either above or below the level of the source of supply.

The further object of the invention is to provide means whereby the entire apparatus is rendered portable, so that it may readily be shifted to any desired point, or whereby the burner alone may be so shifted within the limits of the length of the supply-pipe.

To these ends the invention consists in a novel system of illuminating apparatus and flexible connections between the supply-pipe and burner, and means for hoisting the burner to the desired elevation.

The invention further consists in the combination, with a portable holder or reservoir for the illuminating agent and a burner or burners flexibly connected with said reservoir, of a portable support and hoisting mechanism for elevating the burner or burners to any desired elevation; and, lastly, the invention consists in certain structural features and combinations of parts, substantially as hereinafter fully described, and as set forth in the claims.

In the drawings, A indicates the reservoir, P the supply-pipe, P′ the burner-pipe, and P² the flexible pipe-connection between the burner and supply-pipes.

The reservoir A may be a stationary reservoir, or it may be made portable by providing the same with suitable handles $a$, or it may be mounted on wheels.

The burner B shown is substantially of the same construction as that shown in our Letters Patent of the United States of May 28, 1889, No. 404,064, the shield or casing F being in this case provided at its rear end with a loop or ring $f$, through which passes the standard or mast M, and on its upper face with a hook or ring $f'$ for the ring, loop, or hook $r$ on the end of the hoisting-rope R. It will of course be understood that any other desired form of burner may be used and provided with the means for guiding the same along the mast when hoisted or lowered and for suspending such burner from the hoisting rope or chain. Where the light is a permanent one the mast may be stationary as well as the reservoir, or the latter may be portable for the purpose of carrying the same to a point where it is to be replenished with an illuminant when its contents are exhausted.

The flexible pipe-connection or hose P² may be of any desired construction to resist the action of the oil and of sufficient strength to resist the necessary pressure, or said pipe P² may be constructed of short sections $p^2$ of metallic pipe hinged together in the form of lazy-tongs, as shown in Fig. 3.

The joints between the sections $p^2$ of pipe $P^2$ may be of any desired construction and made fluid-tight in any desired manner. In Fig. 4 we have shown our improved means of jointing the short sections $p^2$ of pipe $P^2$, and these consist of a coupling C, having two branches $c\ c'$ formed at right angles to each other, the branch $c'$ forming a stuffing-box in which is screwed a gland $c^3$, and is or may be provided with a suitable packing. One end of each section $p^2$ of pipe $P^2$ is bent at right angles, and has an annular end flange $p^3$, that fits the stuffing-box snugly, but sufficiently loose to allow it to turn. The straight end of a pipe-section $p^2$ is screwed into branch $c$ of a coupling, and the bent end of a second pipe-section $p^2$ is fitted into the stuffing-box or branch $c'$ of said coupling and passes through its gland $c^3$, thus forming a pivotal connection between the sections of pipe and said sections, forming a lazy-tongs, a joint similar to that just described being formed between the first section of pipe $p^2$ and the supply-pipe P and the last section and the burner-pipe P'.

The reservoir A may be of any desired construction, but preferably of that described in the application of Roughsedge Wallwork, filed June 24, 1889, Serial No. 315,412, or of that described in our joint application for patent filed September 14, 1888, Serial No. 285,381, and the supply-pipe P is preferably provided with our improved regulating-valve and filter V, described in our application for patent filed June 24, 1889, Serial No. 315,402.

When a hose-pipe $P^2$ is used to connect the burner-pipe with the supply-pipe, the ends of said hose-pipe may be connected with the burner and supply pipes, respectively, by means of a pivotal joint, such as described in our application for Letters Patent filed June 24, 1889, Serial No. 315,400, or said parts may be jointed by any well-known or suitable fluid-tight coupling.

The burner may be supported from a fixed support, which may be a beam $b$ within a building or a yard-arm or the mast of a vessel, or it may be supported from a standard or mast M set in the ground, as shown in Fig. 1 in dotted lines, or from a portable mast, which may have sufficient of a base $m$ to maintain it in an upright position, or it may be provided with a spike $m'$, that is driven in the ground. In either case, when the mast is of any height, it is braced by means of brace chains or rods $m'$, one end of which is pivoted to the mast, as at $m^2$, and the other to a spike or pin $m^3$, adapted to be driven in the ground, as shown in Fig. 1.

The mast M may be of wood or iron. We prefer, however, to use a tubular tapering mast on account of its combining lightness with great strength, and when such mast is a portable one and liable to be shifted from place to place we make such mast telescopic to better adapt it for transportation, as shown in Fig. 5. This construction has the further advantage in that the height of the burner above the ground may be adjusted.

Near the foot of the mast we provide a pulley $p$ for the hoisting-rope R, one of the journals of which is provided with a suitable crank C'. In practice, however, we prefer to mount this pulley in bearings formed on a sleeve S, that is detachably secured to the mast by means of set-bolts $s$, a ratchet and pawl being provided to lock the pulley against rotation in one direction.

At the upper end of the mast is secured an arm, in which are mounted two pulleys $p^\times$ and $p'$, over which the hoisting chain, cable, or rope R runs to the burner.

For outdoor purposes we preferably use, instead of an arm or arms, a hood H, of sheet metal, projecting at right angles to and from the mast M, to partially cover the burner, and this hood is secured to a pivot $h$, that fits into a socket in the upper end of the mast M, or into the upper tubular telescopic section of a telescopic mast, as shown in Fig. 5. The hood H is or may also be provided with a wind-vane $h'$, so as to allow the burner to shift with the wind.

To adapt the burner for use as an elevated burner and otherwise, we combine therewith a suitable stand, preferably in the form of a tripod T, as shown in Fig. 2. The said tripod has a short section of rigid supply-pipe $P^3$, to the upper end of which is connected the burner-pipe P', and to the lower end the flexible supply-pipe $P^2$.

In practice we connect the burner-pipe P' detachably with the supply-pipe, as described in our application for patent hereinabove referred to, and as shown in said Fig. 2. By means of this construction the burner may be hoisted to the head of a mast, or it may be used on the ground or at any desired distance from the reservoir, above or below the same, within the limits of the flexible pipe.

For convenience of transporting the reservoir A, it may be mounted on wheels W, Fig. 2, each wheel being mounted on short shafts $w$, secured to arms $w'$ of brackets W', in which brackets the journals or trunnions on the reservoir have their bearings and in which said journals are free to oscillate, so that by simply depressing the handles the reservoir A will be raised off the ground and will then be suspended between the wheels for transportation, as will be readily understood.

The reservoir is provided with a pump $P^4$, for pumping a liquid illuminating agent into said reservoir and compressing the air therein as a means for forcing such agent to the burner, or the illuminating agent may be forced to the burner by means of a liquid under pressure, as described in the application of Roughsedge Wallwork, filed May 30, 1889, Serial No. 312,801, or in any other desirable manner.

Although we have hereinbefore referred to the use of a single burner, it will be understood that we do not limit ourselves thereto, as a plurality of burners may be connected with the burner-pipe P' in any well-known or desired manner by providing the necessary branch pipe or pipes.

We claim—

1. A system of outdoor illumination, comprising a portable reservoir for an illuminating agent, a burner, a flexible or extensible conduit connecting the burner with the illuminant-reservoir, a portable burner-support, and hoisting appliances for hoisting the burner along its support, as and for the purposes specified.

2. A system of outdoor illumination, comprising a portable reservoir for a liquid illuminant, a burner, a flexible or extensible conduit connecting the burner with the reservoir, a portable burner-support, hoisting appliances for hoisting the burner along its support, and a forcing device for forcing the liquid illuminant from the reservoir to the burner through the flexible or extensible conduit, as and for the purposes specified.

3. A system of outdoor illumination, comprising a burner, a flexible or extensible conduit connecting the burner with a portable reservoir, a portable and extensible burner-support, and hoisting appliances for hoisting the burner along its support, as and for the purposes specified.

4. A system of outdoor illumination, comprising a burner, a stand therefor, a flexible or extensible conduit connecting the burner with a portable reservoir, a portable support for the burner and stand, and hoisting appliances for hoisting said burner and stand along its support, substantially as and for the purposes specified.

5. The combination, with the mast M, provided in its upper end with a bearing, and the revoluble burner-support H, provided with a wind-vane and having guide-pulleys mounted thereon, of a burner provided with a guide-eye encompassing the mast, and hoisting-tackle connected with the burner and passing over said guide-pulleys for hoisting and lowering the burner to and from its support, substantially as set forth.

In testimony whereof we affix our signatures in presence of two witnesses.

ROUGHSEDGE WALLWORK.
ARTHUR COLLINGS WELLS.

Witnesses:
GEO. H. JACOB,
MORRIS W. BURCKARD.